US011757752B2

(12) United States Patent  
Moore, Jr. et al.

(10) Patent No.: US 11,757,752 B2
(45) Date of Patent: Sep. 12, 2023

(54) DIAGNOSTIC TESTING OR ANALYSIS OF ELEMENTS OF NETWORK DEVICES

(71) Applicant: ARRIS Enterprises LLC, Suwanee, GA (US)

(72) Inventors: Richard Moore, Jr., Harleysville, PA (US); John D. Ogden, Media, PA (US); David P. Resuta, Chalfont, PA (US)

(73) Assignee: ARRIS ENTERPRISES LLC, Suwanee, GA (US)

(*) Notice: Subject to any disclaimer, the term of this patent is extended or adjusted under 35 U.S.C. 154(b) by 0 days.

(21) Appl. No.: 17/580,876

(22) Filed: Jan. 21, 2022

(65) Prior Publication Data
US 2022/0303207 A1   Sep. 22, 2022

Related U.S. Application Data

(60) Provisional application No. 63/161,530, filed on Mar. 16, 2021.

(51) Int. Cl.
*H04L 43/50* (2022.01)
*H04L 41/06* (2022.01)
*H04L 43/0817* (2022.01)
*H04L 9/40* (2022.01)

(52) U.S. Cl.
CPC .......... *H04L 43/50* (2013.01); *H04L 41/06* (2013.01); *H04L 43/0817* (2013.01); *H04L 63/0823* (2013.01)

(58) Field of Classification Search
CPC ..... H04L 43/50; H04L 41/06; H04L 43/0817; H04L 63/0823
See application file for complete search history.

(56) References Cited

U.S. PATENT DOCUMENTS

| | | | | |
|---|---|---|---|---|
| 2013/0295854 | A1* | 11/2013 | Olson | H04L 41/06 455/67.11 |
| 2015/0140986 | A1* | 5/2015 | Lamb | H04L 41/0659 455/418 |
| 2015/0381467 | A1* | 12/2015 | Girmonsky | H04L 43/065 709/224 |
| 2016/0364250 | A1 | 12/2016 | Seibert et al. | |
| 2020/0314923 | A1* | 10/2020 | Deshmukh | H04W 4/00 |

OTHER PUBLICATIONS

International Search Report and the Written Opinion of the International Searching Authority dated Apr. 13, 2022 in International (PCT) Application No. PCT/US2022/013254.

\* cited by examiner

*Primary Examiner* — Philip C Lee
(74) *Attorney, Agent, or Firm* — Wenderoth, Lind & Ponack, L.L.P.

(57) ABSTRACT

Extensive resources can be required to stage, clean-and-screen, repair, diagnose, etc. a network device. To reduce the impact on resources, a diagnostic device is used to perform diagnostic testing or analysis of a network device, such as a set top box received at a facility. The diagnostic device connects to the network device via one or more connections to initiate a diagnostic testing and analysis. The network device sends diagnostic data to the diagnostic device which uses this data to generate a diagnostic report and/or sends this data to a network resource. The diagnostic testing or analysis is used to appropriately direct the network device, for example, for repair, redistribution, disposal, or other treatment.

20 Claims, 6 Drawing Sheets

DIAGNOSTIC TESTING OR ANALYSIS OF ELEMENTS OF NETWORK DEVICES

BACKGROUND

Many service providers supply network devices to users, such as customer or entities. These network devices routinely require analysis to determine functionality. For example, network devices returned to a facility traditionally require labor and time intensive diagnostic testing or analysis to determine the functionality of the network device. This testing or analysis can indicate whether a network device should be refurbished or reprogrammed, scrapped, and/or repaired. However, traditionally this testing or analysis only returns a binary result without indicating any details associated with the testing or analysis and generally requires extensive resources including manual intervention. Thus, there is a need to expedite the processing of network devices to reduce costs and increase productivity.

SUMMARY

As described herein is a network and method for performing diagnostic testing or analysis to determine the functionality of one or more network devices. A considerable amount of resources can be expended per network device on staging, processing (such as clean-and screen), diagnostics, repair, and/or any other analysis. Reducing the required resources (such as time, man-power, incorrect redirection based on inadequate, incomplete, or false information, etc.) would increase productivity and decrease expenses. For example, a network device that is returned from a facility after being previously deployed and/or a new network device can be processed at a facility to direct the network device appropriately. Typically this processing fails to adequately diagnose issues with the network device and strains resources due to time for processing and manual steps. Delays in processing create deployment issues that impact for example, customer relations, profitability, costs, etc. Further, typical processing does not provide reliable identification of potential or actual issues with the network device. By providing a diagnostic device that performs a robust diagnostic testing or analysis of one or more elements of each of the network devices, resources can be conserved. For example, the network device is booted with minimal dependencies to ensure functioning of one or more elements of the network device and a reliable diagnostic testing or analysis is performed such that the time to evaluate or perform diagnostics on a network device is reduced while any issues or failures in functionality are quickly identified such that the network device can be expeditiously directed for appropriate handling. The diagnostic device can be connected to one or more network devices via one or more distinct connections so as to provide a comprehensive diagnostic testing and analysis of each of the connected network devices. The diagnostic device can ensure that any sensitive and personal data is wiped or cleaned from the network device prior to directing the network device, for example, to be refurbished, repaired, restocked, redeployed, etc.

An aspect of the present disclosure provides a method of a network device for performing a diagnostic analysis. The method comprising authenticating a connection to a diagnostic device, loading a diagnostic image, performing the diagnostic analysis based on the diagnostic image, sending diagnostic data to the diagnostic device, wherein the diagnostic data is based on the diagnostic analysis, and disconnecting from the diagnostic device.

In an aspect of the present disclosure, the method further comprising receiving a diagnostics initiation command from a diagnostic device, and wherein the performing the diagnostic analysis is based on the diagnostics initiation command.

In an aspect of the present disclosure, the method wherein the authenticating the connection to the diagnostic device comprises receiving secure sockets layer (SSL) certificate from the diagnostic device, and verifying the SSL certificate against a root certificate authority (CA) certificate.

In an aspect of the present disclosure, the method wherein the diagnostic image is downloaded from the diagnostic device.

In an aspect of the present disclosure, the method wherein the diagnostic image is loaded from a programmable memory of the network device.

In an aspect of the present disclosure, the method wherein the performing the diagnostics analysis comprises detecting a status of one or more elements of the network device and generating the diagnostic data based on the status of the one or more elements.

In an aspect of the present disclosure, the method further comprising receiving a program image from the diagnostic device based on the diagnostic data.

An aspect of the present disclosure provides a network device for performing a diagnostic analysis. The network device comprising a memory storing one or more computer-readable instructions and a processor configured to execute the one or more computer-readable instructions to authenticate a connection to a diagnostic device, load a diagnostic image, perform the diagnostic analysis based on the diagnostic image, send diagnostic data to the diagnostic device, wherein the diagnostic data is based on the diagnostic analysis, and disconnect from the diagnostic device.

In an aspect of the present disclosure, wherein the processor is further configured to execute the one or more computer-readable instructions to receive a diagnostics initiation command from a diagnostic device, and wherein the performing the diagnostic analysis is based on the diagnostics initiation command.

In an aspect of the present disclosure, wherein the authenticating the connection to the diagnostic device comprises receiving secure sockets layer (SSL) certificate from the diagnostic device and verifying the SSL certificate against a root certificate authority (CA) certificate.

In an aspect of the present disclosure, the processor is configured to execute one or more further instructions to.

In an aspect of the present disclosure, wherein the diagnostic image is downloaded from the diagnostic device.

In an aspect of the present disclosure, wherein the diagnostic image is loaded from a programmable memory of the network device.

In an aspect of the present disclosure, wherein the performing the diagnostics analysis comprises detecting a status of one or more elements of the network device and generating the diagnostic data based on the status of the one or more elements.

In an aspect of the present disclosure, wherein the processor is further configured to execute the one or more computer-readable instructions to receive a production image from the diagnostic device based on the diagnostic data.

An aspect of the present disclosure provides a non-transitory computer-readable medium of a network device storing one or more instructions for performing diagnostic analysis, which when executed by a processor of the network device, cause the network device to perform one or more operations to perform any one or more of the above method steps.

An aspect of the present disclosure provides a method of a diagnostic device for initiating a diagnostic analysis of a network device. The method comprises authenticating a connection to the network device, initiating a diagnostic analysis of the network device based on the diagnostic command, receiving diagnostic data from the network device, wherein the diagnostic data is based on the diagnostic analysis, and generating a diagnostic report based on the diagnostic data.

In an aspect of the present disclosure, the method further comprising loading a program image on the network device based on the diagnostic report.

In an aspect of the present disclosure, the method further comprising requesting the program image from a network resource based on the diagnostic report, information received from the network device, or both.

In an aspect of the present disclosure, the method further comprising outputting the diagnostic report to a display device.

In an aspect of the present disclosure, the method further comprising identifying a status of one or more elements of the network device based on the diagnostic data, and wherein the generating the diagnostics report is based on the identifying the status of the one or more elements.

In an aspect of the present disclosure, the method further comprising sending a diagnostic command to the network device to cause the network device to enter a diagnostics mode.

In an aspect of the present disclosure, the method further comprising connecting to the network device via a plurality of connections, connect to the network device via a plurality of connections, wherein a first connection of the plurality of connections is a wired connection and a second connection of the plurality of connections is a wireless connection.

An aspect of the present disclosure provides a diagnostic device for performing a diagnostic analysis. The diagnostic device comprising a memory storing one or more computer-readable instructions and a processor configured to execute the one or more computer-readable instructions to authenticate a connection to the network device, initiate a diagnostic analysis of the network device based on the diagnostic command, receive diagnostic data from the network device, wherein the diagnostic data is based on the diagnostic analysis, and generate a diagnostic report based on the diagnostic data.

In an aspect of the present disclosure, the processor is further configured to execute the one or more computer-readable instructions to load a program image on the network device based on the diagnostic report.

In an aspect of the present disclosure, the processor is further configured to execute the one or more computer-readable instructions to request the program image from a network resource based on the diagnostic report, information received from the network device, or both.

In an aspect of the present disclosure, the processor is further configured to execute the one or more computer-readable instructions to output the diagnostic report to a display device.

In an aspect of the present disclosure, the processor is further configured to execute the one or more computer-readable instructions to identify a status of one or more elements of the network device based on the diagnostic data and wherein the generating the diagnostics report is based on the identifying the status of the one or more elements.

In an aspect of the present disclosure, the processor is further configured to execute the one or more computer-readable instructions to send a diagnostic command to the network device to cause the network device to enter a diagnostics mode.

In an aspect of the present disclosure, the processor is further configured to execute the one or more computer-readable instructions to connect to the network device via a plurality of connections, wherein a first connection of the plurality of connections is a wired connection and a second connection of the plurality of connections is a wireless connection.

An aspect of the present disclosure provides a non-transitory computer-readable medium of a diagnostic device storing one or more instructions for performing a diagnostic analysis, which when executed by a processor of the diagnostic device, cause the diagnostic device to perform one or more operations of any one or more of the above method steps.

Thus, according to various aspects of the present disclosure described herein, it is possible to improve the diagnostic testing or analysis of a network device so as to expeditiously and appropriately direct the network device.

BRIEF DESCRIPTION OF DRAWINGS

In the drawings, like reference numbers generally indicate identical, functionally similar, and/or structurally similar elements.

DETAILED DESCRIPTION

The following detailed description is made with reference to the accompanying drawings and is provided to assist in a comprehensive understanding of various example embodiments of the present disclosure. The following description includes various details to assist in that understanding, but these are to be regarded merely as examples and not for the purpose of limiting the present disclosure as defined by the appended claims and their equivalents. The words and phrases used in the following description are merely used to enable a clear and consistent understanding of the present disclosure. In addition, descriptions of well-known structures, functions, and configurations may have been omitted for clarity and conciseness. Those of ordinary skill in the art will recognize that various changes and modifications of the examples described herein can be made without departing from the spirit and scope of the present disclosure.

Figure 1:
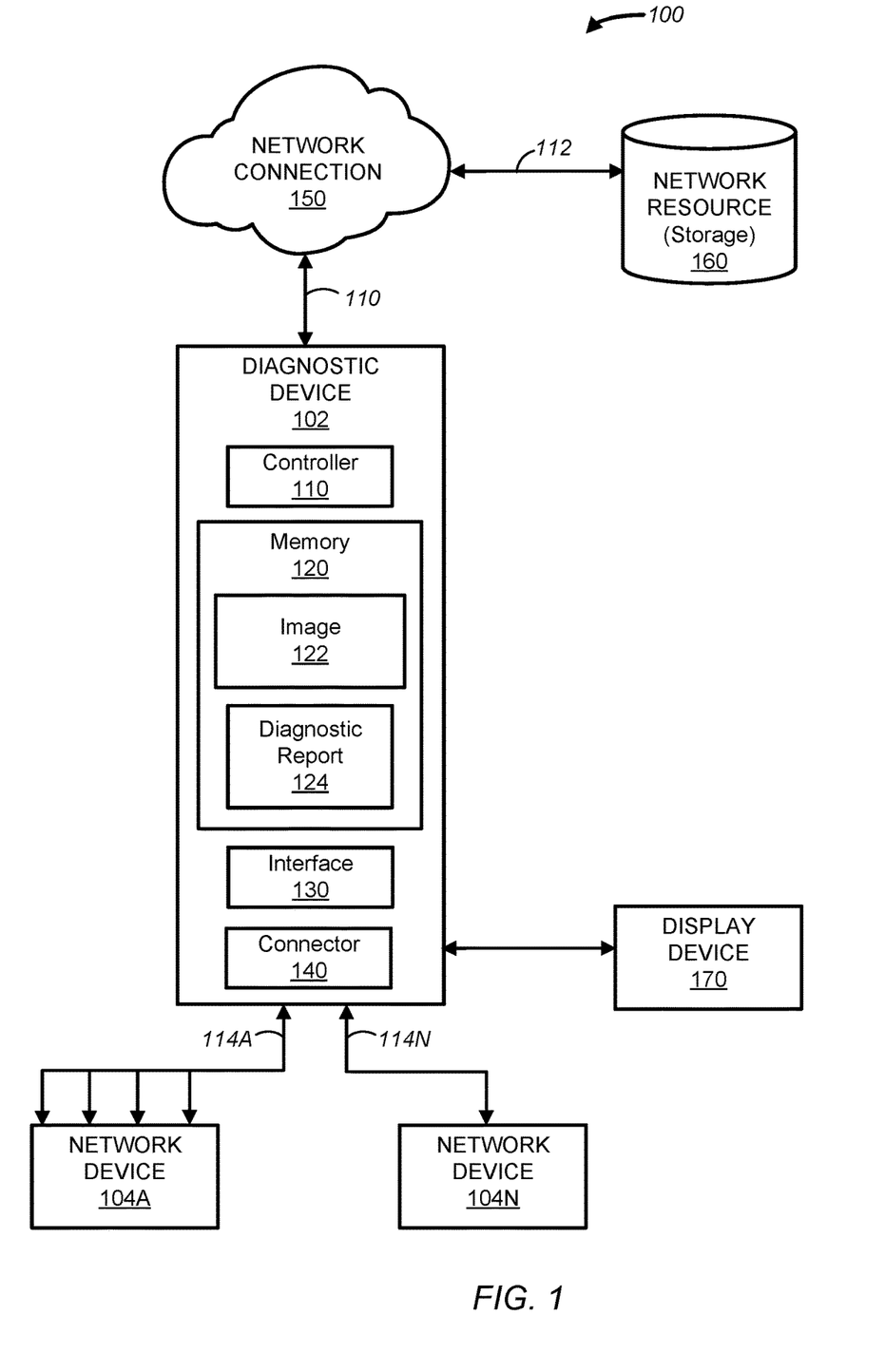
FIG. 1 is an illustration of a network that provides a diagnostic device for initiating diagnostic testing or analysis of a network device, according to one or more aspects of the present disclosure.

Referring now to FIG. 1, the figure illustrates a network 100 that includes a network resource 160 coupled via a connection 112 to a network connection 150, a diagnostic device 102 coupled to the network connection 150 via a connection 110, and one or more network devices 104 connected to the diagnostic device 102 via one or more connections 114. In one or more embodiments, the network connection 150 can be any of an Internet Service Provider (ISP), a router, a gateway, an access point, an extender access point, any other type of network connection, or a combination thereof. The network or any one or more connections can be implemented as a wireless access network (WAN), a local access network (LAN), a virtual private network (VPN), metropolitan (MAN), personal area network (PAN), wireless LAN (WLAN), storage area network (SAN), a data over cable service interface specification (DOCSIS) network, multi-media over coax alliance (MoCA) cable, a fiber optics network (for example, fiber to the home (FTTH), fiber to the x (FTTX), or hybrid fiber coaxial (HFC)), a public switched data network (PSDN), a global Telex network, or a 2G, 3G, 4G, 5G, or 6G network, for example.

The network resource 160 can include any one or more components of a representative computer system, server, or any other computing device, for example, one or more components of a diagnostic device 102, a network device 104, or both. In one or more embodiments, the network resource 160 can be an Internet cloud resource or a cloud-based service, a cloud-based repository, any other type of cloud or network resource, or any combination thereof. In one or more embodiments, the network resource 160 can comprise any type of suitable database or database configuration, such as a relational database, a structured query language (SOL) database, a distributed database, or an object database, a flat-file system, a table, a register, a data structure, any other type of memory or repository, or any combination thereof for storing one or more images, for example, a product image, a diagnostic image, a programmable rescue image, a rescue image, one or more diagnostic reports, a profile information associated with a type of user, any other type of data or storage, or any combination thereof. The network resource 160 can track a network device 104 by storing one or more diagnostic reports, such as a diagnostic report 124 from the diagnostic device 102, information associated with the network device 104, such as a bar code or information received from the network device 102, or both. The connection 112 can be a wired and/or wireless connection to the network resource 160 and the network connection 150. The connection 112 can be implemented using any type of connection including but not limited to a Wi-Fi (wireless fidelity) connection, a Bluetooth connection, a hotspot connection, an Ethernet connection, any other type of connection, or a combination thereof. Any one or more protocols can be utilized for communicating traffic or data via connection 112 including, but not limited to, Bluetooth, Bluetooth low energy, ZigBee, Z-Wave, 2G, 3G, 4G, 5G, 6G, LTE, long range (LoRa), LoRaWAN, any other protocol, or a combination thereof.

In one or more embodiments, the network 100 can comprise one or more network devices 104, for example, network device 104A and network device 104N, where N represents any number of network devices 104. A network device 104 can comprise, for example, a cable receiver box, such as a set top box, any other device that provides one or more programmable services, or any other type of set top box. For example, the network device can comprise a device typically processed through any of a cable service provider (such as any of a cable modem, a cable router, a networked security device (for example, a camera), a sound bar, a remote control, any other cable service provider device, or any combination thereof), an embedded computing device provider (such as any of a smart speaker, a printer, a network storage device, a digital currency mining device, a smart watch, a cell phone, a data center computing device, any other embedded computing device, or a combination thereof), or any combination thereof. Connections 114A and 114N (where N represents any number of connections 114), collectively referred to as connection(s) 114, provide for transmitting and/or receiving data to and/or between the network device 104 and the diagnostic device 102. In one or more embodiments, connection 114 can utilize any one or more protocols as discussed with respect to connection 112. To perform a diagnostic testing or analysis of one or more features of the network device 104A and/or network device 104N, the diagnostic device 102 can connect to the network device 104A and/or network device 104N via a plurality of connections 114A/114N. For example, the plurality of connections 114 can comprise a wired connection, a wireless connection, or both, such as any of a radio frequency (RF) connection, Bluetooth connection, a Wi-Fi connection, an infrared (IR) connection, a universal serial bus (USB) connection, an high-definition multimedia interface (HDMI) connection, any other type of connection, or any combination thereof.

The diagnostic device 102 is connected to the network connection 150 via a connection 110. Connection 110 can be the same as or similar to connection 112 or any other connection that provides for communication between the diagnostic device 102 and the network connection 150. The diagnostic device 102 can comprise a controller 110, a memory 120, an interface 130, and one or more connectors 140. While FIG. 1 illustrates diagnostic device 102 coupled to the network resource 160 via the network connection 150, the present disclosure contemplates that network device 102 can be directly coupled to the network resource 160.

The diagnostic device 102 may be implemented in whole or in part by a computer system, a server, any other device that is capable of connection to a network connection 150 and/or one or more network devices 104 including, for example, a device similar to or the same as a network device 104 as discussed with reference to FIG. 2, using hardware, software, firmware, non-transitory computer readable media having instructions stored thereon, or a combination thereof and may be implemented in one or more computer systems or other processing systems. Hardware, software, or any combination thereof may embody modules and components used to implement the methods and steps of the present disclosure. If programmable logic is used, such logic may execute on a commercially available processing platform, such as controller 110, configured by executable software code to become a specific purpose computer or a special purpose device (for example, programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device or controller 110 and a memory 120 may be used to implement the above described embodiments. A processor unit, device or controller 110 as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a memory 120. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Controller 110 may be a special purpose or a general purpose processor device specifically configured to perform the functions discussed herein. The controller 110 may be connected to a communications infrastructure, such as a bus, message queue, network, multi-core message-passing scheme, etc. Memory 120 can comprise any one or more storage devices, for example, a random access memory, a read-only memory, a hard disk drive (HDD), a removable storage drive, such as a floppy disk drive, a magnetic tape drive, an optical disk drive, a flash memory, any other storage device, or a combination thereof. Memory 120 can store data associated with the diagnostic testing and analysis of a network device 104, for example, an image 122 and a diagnostic report 124. The data may be configured in any type of suitable database configuration, such as a relational database, a structured query language (SOL) database, a distributed database, or an object database, a flat-file system, a table, a register, a data structure, any other type of data configuration for a memory, or any combination thereof. Computer program medium, non-transitory computer-readable medium, and computer usable medium may refer to memories, such as the memory 120 which may be memory semiconductors (for example, DRAMs, etc.). The memory 120 can store one or more computer programs, software, and/or applications, that when executed, may enable diagnostic device 102 to implement the present methods as discussed herein. In particular, the computer programs can comprise one or more computer-readable instructions that when executed by controller 110 cause the diagnostic device 102 to implement the methods illustrated by FIGS. 2-7, as discussed herein.

The diagnostic device 110 may also include an interface 130. The interface 130 may be configured to allow software and data to be transferred between the diagnostic device 102 and external devices, such as network connection 150, network resource 160, a network device 104, or a combination thereof using any type of protocol, such as Bluetooth, Bluetooth low energy (BLE), Wi-Fi, etc. The interface 130 may include display interface for a display device 170, for example, a monitor, a cathode ray tube (CRT) display, a screen, a liquid crystal display (LCD), a light-emitting diode (LED) display, a capacitive touch display, a thin-film transistor (TFT) display, any other user interface, any other display device, or a combination thereof. While display device 170 is illustrated external from the diagnostic device 102, the present disclosure contemplates that display device 170 can be part of or within diagnostic device 102. The diagnostic device 110 can output to the display device 170 any of one or more diagnostic reports 124, information associated with the network device 102, any other data, or any combination thereof.

The diagnostic device 102 can also include one or more connectors 140 to connect the diagnostic device 102 to one or more network devices 104, such as a network device 104A and a network device 104N, a display device 170, any other device, or a combination thereof. The one or more connectors 140 can include a power connector (such that the diagnostic device 102 can power on and/or off a network device 104), an HDMI connector, an IR receiver, a USB connector, an RF connector, an Ethernet connector, a video input/output connector(s), any other type of connector, or a combination thereof. In one or more embodiments, the diagnostic device 102 can send one or more signals to the network device 104 via any one or more connectors 140 so as to perform a diagnostic testing or analysis of the network device 104. In one or more embodiments, the diagnostic device 102 initiates a diagnostic testing or analysis of the network device 104 by running a test script (for example, as an image 122) that triggers the initiation of a program or software at the network device 104 to perform automated diagnostic testing or analysis of the network device 104. The diagnostic device 102 can send one or more test signals to the network device 104 via any one or more of the connectors 140, one or more connections 114, or both. For example, the diagnostic device 102 can provide test inputs (such as a signal) to support a diagnostic testing or analysis application executing at the network device 104 (for example, a diagnostic image 205 as discussed in reference to FIG. 2), such as any of an IR input, an RF input, an LED test input, a voltage sensor test input, an HDMI input, a USB input, a wireless input, any other input, or any combination thereof.

Figure 2:
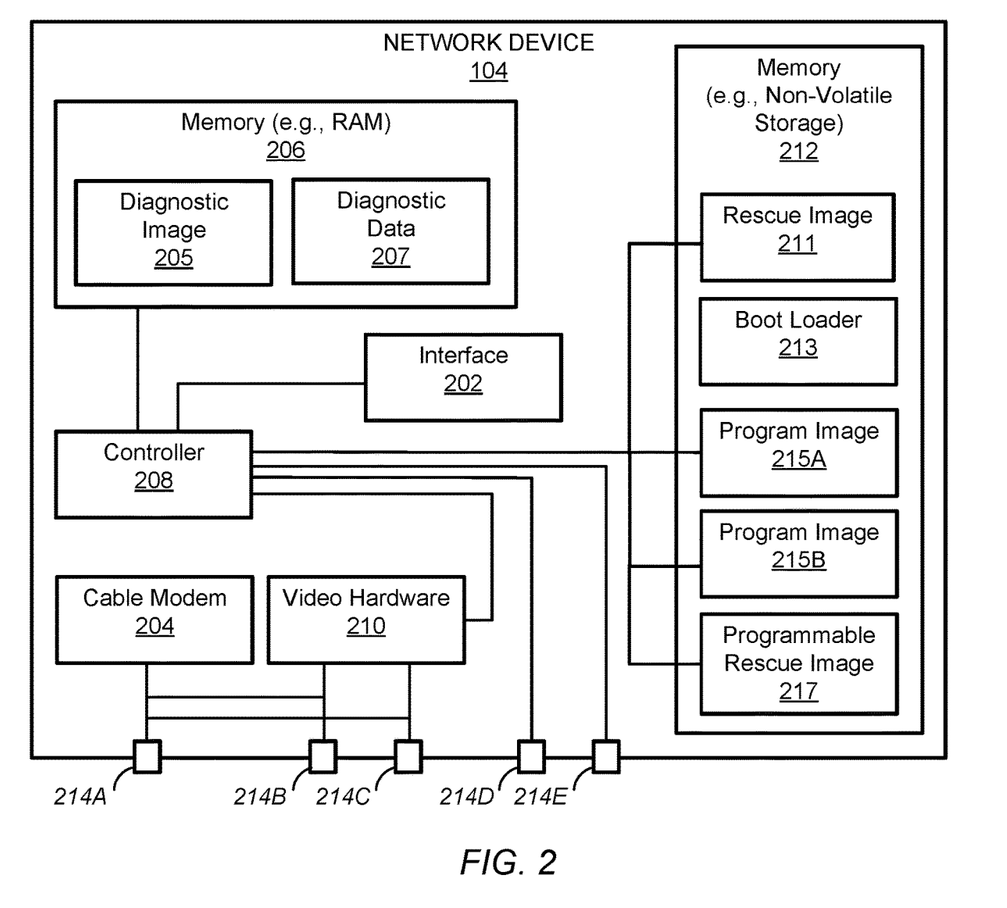
FIG. 2 illustrates a representative network device in which embodiments of the present disclosure, or portions thereof, may be implemented, according to one or more aspects of the present disclosure.

FIG. 2 illustrates a representative network device 104 in which embodiments of the present disclosure, or portions thereof, may be implemented, according to one or more aspects of the present disclosure. The network device 104 can comprise a memory 206, such as a random access memory (RAM), a memory or non-volatile storage 212, an interface 202, a controller 208, a cable modem 204, a video hardware 210, and one or more connectors 214, such as connectors 214A-E, collectively referred to as collector(s) 214.

Memory or non-volatile storage 212 is a computer-readable medium that can comprise a programmable memory (such as a programmable flash memory), a non-volatile storage (such as a HDD, a flash memory, etc.) that can store any type of data and/or computer program, such as a rescue image 211, one or more program images 215 (such as program image 215A and program image 215B, collectively referred to as program image(s) 215), a programmable rescue image 217, a boot loader 213, any other data or program, or a combination thereof. In one or more embodiments, a memory or non-volatile storage 212 comprises a flash memory that has stored thereon any of a boot loader 213, a non-alterable rescue image 211, serialization data, including a serial number, a media access control (MAC) address, one or more keys or certifications, any other unalterable image and/or data, or any combination thereof, and/or a programmable flash memory that has stored thereon any of an alterable rescue image 211, a manufacturer test image, a production image 215, user data, or any combination thereof. The memory or non-volatile storage 212 can be similar to or the same as any memory discussed with reference to memory 120 of FIG. 1. The boot loader 213 is executed by the controller 208 each time the network device 104 is turned on or powered up so as to load a computer program, such as rescue image 211, program image 215, and/or programmable rescue image 217. The rescue image 211 is a computer program that is loaded by the boot loader 213 to provide administration and repair of the network device 104 after a crash or other failure. The programmable rescue image 217 can be a rescue image 211 that is downloaded to the diagnostic device 102, for example, from a diagnostic device 102, a network resource 160, or both. The program image 215 is a computer program that is loaded by the boot loader 213 into memory 206 and executed by the controller 208 and provides for the operation of the network device 104. A program image 215A can be a production image or factory flash image (FFI) that provides for normal operation of the network device 104, for example by a user or customer, while program image 215B can be loaded in memory 206 as a diagnostic image 205 to provide for diagnostic testing and analysis by the diagnostic device 102.

The memory 206 is a computer-readable medium that can store any type of data and/or images, such as a diagnostic image 205, a diagnostic data 207, any other data, or any combination thereof. The diagnostic image 205 can be an image that comprises one or more computer-readable instructions executable by a controller 208. The diagnostic image 205 can be loaded from memory or non-volatile storage 212 via boot loader 213 or can be downloaded from the diagnostic device 102 and/or the network resource 160 to the memory 206. The diagnostic image 205 can request that the diagnostic device 102 provide one or more inputs (or one or more signals) to the network device 104 so as to test any of one or more connections, one or more connectors, any other software and/or hardware element, or any combination thereof. The diagnostic image 205 can receive one or more instructions or commands from the diagnostic device 102, for example, one or more test scripts running on the diagnostic device 102 can trigger the diagnostic image 205 to perform one or more diagnostic tests or analysis.

The diagnostic image 205 can provide one or more functions, such as any of authenticating (for example, any of a diagnostic device 102, a connection with a diagnostic device 102, an image 122 received from a diagnostic device 102, any other element or feature, or any combination thereof), preventing execution of a diagnostic image 205 when authentication is not successful, interfacing with a diagnostic device 102, testing and/or diagnosing one or more failures of one or more elements (for example, a hardware and/or a software failure) of the network device 104, reporting data collected during execution of the diagnostic image 205 (for example, reporting diagnostic data 207), coordinating and/or interacting with the diagnostic device 102 for the diagnostic device 102 to generate one or more inputs or signals, download an image, store an image, remove an image or data (for example, customer or user data, outdated or previous versions of an image, any other type of data or image, or any combination thereof), perform any other diagnostic or testing function, or any combination thereof.

The network device 104 can collect diagnostic data 207 associated with the execution of the diagnostic image 205. The diagnostic data 207 can be any type of data collected or received related to a diagnostic testing or analysis of the network device 104, for example, as discussed with reference to FIG. 3. The diagnostic data 207 can be sent from the network device 104 to the diagnostic device 102 for storage as part of a diagnostic report 124. In one or more embodiments, the diagnostic data 207 is sent to the network resource 160 from the network device 104 and/or the diagnostic device 102 in real-time, periodically, routinely, at the request of the diagnostic device 102, or any combination thereof.

The controller 208 functions similar to or the same as controller 102 discussed with reference to FIG. 1. The controller 208 can execute one or more computer-readable instructions of a diagnostic image 205, a program image 215, a rescue image 211, a programmable rescue image 217, any other computer program, or any combination thereof. The controller 208 can authenticate any image before execution of the image. The controller 208 can also control the operation of and/or receive one or more inputs from one or more elements of the network device 104, such as cable modem 204 (for example, an embedded cable modem), video hardware 210, one or more connectors 214, or any combination thereof. In one or more embodiments, connector 214A can be an RF connector that provides input to the cable modem 204, connectors 214B and 214C can be a video input/output connector that provides input/output for a video hardware 210, connector 214D can be a USB connector, and connector 214E can be an Ethernet input. Connector 214 can comprise any type of connector that provides input/output for the network device 104.

Figure 3:
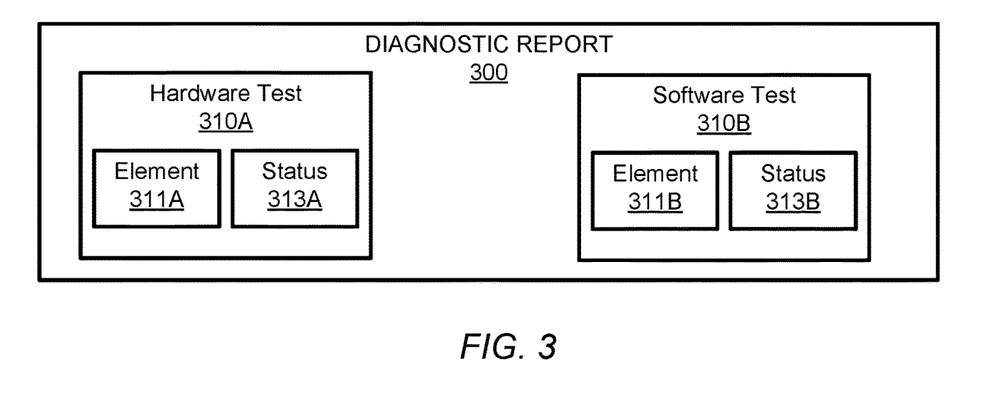
FIG. 3 is a diagram illustrating a diagnostic report, according to one or more aspects of the present disclosure.

FIG. 3 is a diagram illustrating a diagnostic report 300, according to one or more aspects of the present disclosure. Diagnostic report 300 can include one or more tests 310 and one or more data associated with the one or more tests. For example, diagnostic report 300 can include a hardware test 310A and a software test 310B, collectively referred to as test 310. Each test 310 can have associated data, such as element 311 and status 313. For example, a hardware test 310A can include one or more elements 311A, for example, one or more connectors 214 and store data associated with testing of the one or more elements 311A, for example, as a status 313A associated with the one or more connectors 214. The status 313A can include a binary value, such as a pass/fail indication, or any other value or text indicative of the results of a test of an element 311A. Similarly, a software test 310B can include one or more elements 311B, for example, one or more software components, one or more interfaces, or any operation and/or function of the network device 104 associated with testing of the one or more elements 3111B, for example, as a status 313B. The status 313B can include a binary value such as a pass/fail, a value or text indicative of the results of a test of an element 3111B, for example, a data rate, a checksum, any other value, or any combination thereof. For example, Table 1A illustrates a hardware test 310A while Table 1B illustrates a software test 310B. In one or more embodiments, a hardware test 310A can comprise one or more tests associated with one or more elements 311A, such as a test of any of one or more connectors 214 (for example, one or more connectors 214A-214P, where P represents any number of connectors 214), an interface 202, a controller 208, cable modem 204, a memory 206, a memory or non-volatile storage 212, any other element $311A_N$, where N represents any number of elements 311A, or any combination thereof. For example, a hardware test 310A can comprise a RAM memory, flash memory and/or hard disk drive test for meta-data for available life of the device, a bad block report, a stress test, a temperature test, any other read/write test, or any combination thereof, a network interface functionality test (such as a stress test), an output level test (such as a compliance test, or any combination thereof, a CPU stress test (such as for monitoring CPU temperature), an HDMI output level and/or compliance test, a Wi-Fi output test, a Bluetooth output test, a cable modem functionality test, an identification test (such as a test to determine the stored serialization data, model number, serial, number any other stored certificates and/or keys, or any combination thereof), internal data bus test, an external interface test (such as an IR input test, any physical input test (such as a button, a switch, a knob, etc.), an LED test, any other user interface test, or a combination thereof), any other element 311 test, or any combination thereof. In one or more embodiments, a software test 310B can comprise one or more tests associated with one or more elements 311B, such as a data rate test, a checksum test (for example, of any one or more images or memory locations), a program image 215 A test, any other element 311B$_M$ (where M represents any number of elements 311B) or any combination thereof. Diagnostic report 124 of FIG. 1 can be the same as or similar to diagnostic report 300.

TABLE 1A

Hardware Test 310A

| Element 311A | Status 313A |
|---|---|
| Connector 214A | <Value> |
| Connector 214B | <Value> |
| Connector 214C | <Value> |
| Connector 214D | <Value> |
| Connector 214E | <Value> |
| Connector 214P | <Value> |
| Interface 202 (e.g., network interface) | <Value> |
| Controller 208 | <Value> |
| Cable Modem 204 | <Value> |
| Internal Data Bus | <Value> |
| Memory 206 (e.g., flash memory, RAM, etc.) | <Value> |
| Memory 212 (e.g., hard disk drive) | <Value> |
| Element 311AN | <Value> |

TABLE 1B

Software Test 310B

| Element 311B | Status 313B |
|---|---|
| Data Rate | <Value> |
| Checksum | <Value> |
| Program Image 215A | <Value> |
| Program Image 215B | <Value> |
| Element 311BM | <Value> |

Figure 4:
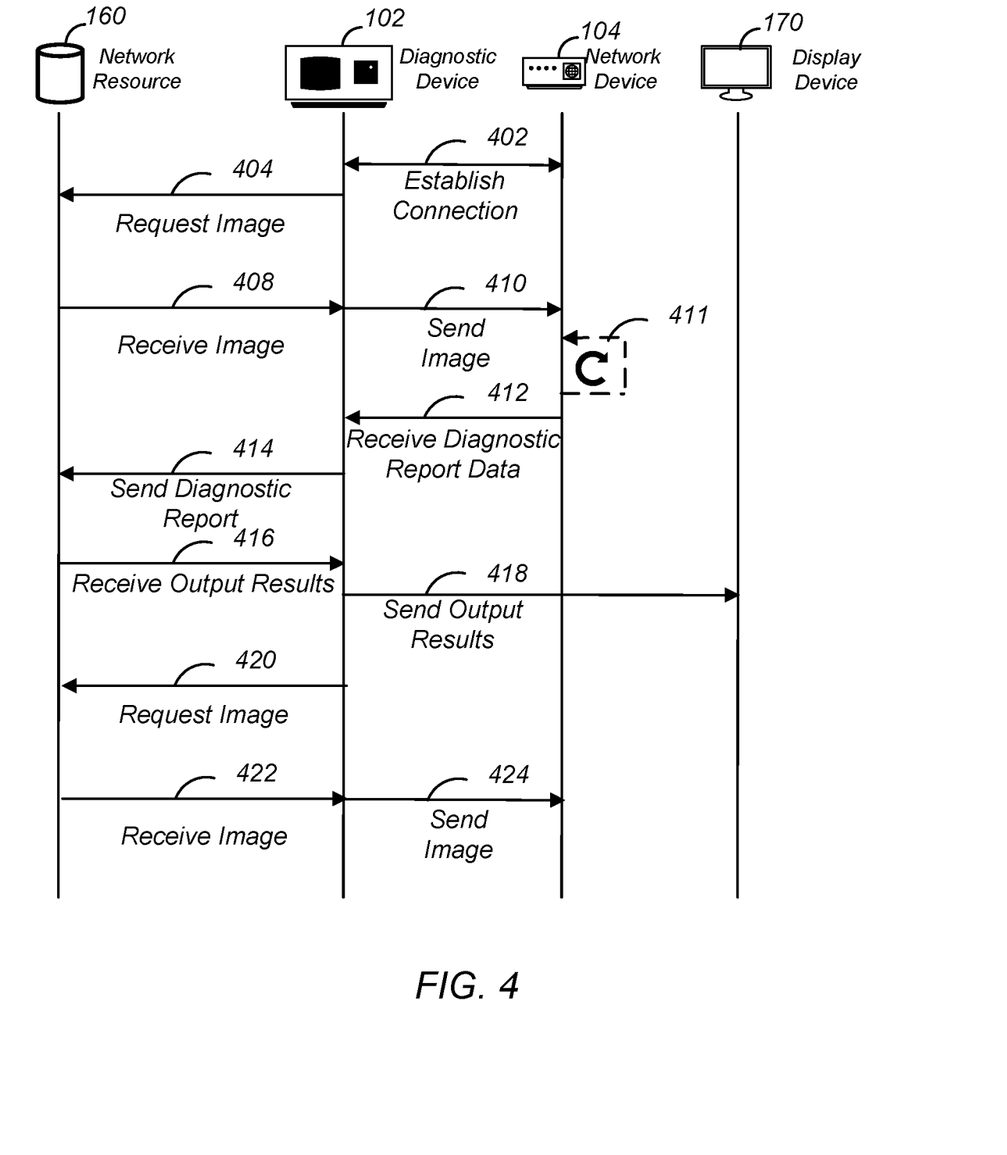
FIG. 4 is a flow diagram for initiating a diagnostic testing or analysis of a network device, according to one or more aspects of the present disclosure.

FIG. 4 is a flow diagram for initiating a diagnostic testing or analysis of a network device 104, according to one or more aspects of the present disclosure. A network device 104 can be tested or analyzed to determine the functionality of one or more elements (such as one or more elements 311) of the network device 104. The testing or analysis can identify the one or more elements that do not meet a criteria or a threshold and can also indicate the reason or data associated with the one or more elements.

To begin, the diagnostic device 102 can establish at 402 a connection with the network device 104. A connection can be established via one or more interfaces, one or more connections to one or more connectors of the network device 104, any other connection, or any combination thereof. The establishing the connection 402 can include one or more physical or wireless connections between the diagnostic device 102 and the network device 104 and execution of an authentication routine, software, or program. For example, if the network device 104 is able to be powered on, the connection to the diagnostic device 102 can trigger the execution by controller 208 of an authentication of the diagnostic device 102. The network device 104 can send the diagnostic device 102 an authentication code or otherwise indicate that the connection is established and that the network device 104 is in a diagnostic mode. Authentication prevents the network device 104 from inadvertently switching from a normal operational mode to a diagnostics mode. In one or more embodiments, the network device 104 can be placed in or switched to the diagnostic mode by a key sequence, such as a sequence of any of one or more bits, one or more packets, one or more signals, any one or more other indicators, or a combination thereof sent from the diagnostic device 102 to the network device 104 via any one or more connections 114, a predetermined voltage at one or more connectors 214, any other sequence, or a combination thereof. In one or more embodiments, the network device 102 loads a rescue image 211, a programmable rescue image 217, a program image 215, or any combination thereof to perform the authentication.

Once the connection is established and the network device 104 is placed in a diagnostic mode, the diagnostic device 102 can send a request at 404 to network resource 160 for an image 122. The request can include a request for a diagnostic image, such as an image 122 for downloading to a network device 104 as diagnostic image 205, one or more identifiers associated with network device 104 (such as any of a serial number, a make, a model, a hardware version, a software version, any other identifying information, or a combination thereof), a timestamp, any other information, or a combination thereof. The diagnostic device 102 can receive at 408 the image 122 from the network resource 160. The diagnostic device 102 can send at 410 the image 122 to the network device 104. The image 122 can be stored as diagnostic image 205 in memory 206 of the network device 104. In one or more embodiments, the diagnostic image 205 can be local to the network device 104, such as stored as a program image 215B and loaded into memory 206 by boot loader 213, for example, when the network device 104 is placed in a diagnostic mode. In one or more embodiments, the diagnostic device 102 has the image 122 stored locally in memory 120 and does not require communication with the network resource 160.

The sending the image at 410 can cause the controller 208 to execute the one or more instructions associated with the diagnostic image 205. In one or more embodiments, the diagnostic device 102 can send a sequence of one or more bits or an instruction that causes the controller 208 to execute the one or more instructions of a diagnostic image 205 stored in memory 206. At 411, the controller 208 can execute the one or more instructions for the diagnostic testing or analysis of one or more elements of the network device 104. In one or more embodiments, at 411, the network device 104 can, for example, initiates a test 310 that causes the diagnostic device 102 to respond with a signal directed to the network device 104 whereupon the network device 104 generates report data, such as data indicative of a detection of the signal. For example, the network device 104 can initiate a test at a network port or connector of the network device 104 by sending an instruction to the diagnostic device 102 that causes the diagnostic device 102 to send a signal to the network port or connector and/or data associated with the test 310 is generated by the network device for communication to the diagnostic device 102 as diagnostic data 207. As another example, the diagnostic device 102 can initiate one or more simulations, such as the diagnostic device 102 simulating a television connected to the HDMI connector or port 214, that sends a signal to the network device 102 and whereupon a diagnostic report 124 is generated and/or data is collected and sent to a network resource 160 by the diagnostic device 102 based on a response or lack thereof from the network device 104.

The diagnostic device 102 receives at 412 diagnostic data 207 from the network device 104. The diagnostic data 207 can include information associated with an element 311 and corresponding status 313 or any other information associated with the diagnostic testing or analysis of the network device 104. The diagnostic data 207 can be sent from the network device 104 to the diagnostic device 102 in real-time, periodically, routinely, at the request of the diagnostic device 102, or any combination thereof.

The diagnostic device 102 sends at 414 a diagnostic report 124 to the network resource 160. In one or more embodiments, the diagnostic report 124 can be stored locally at the diagnostic device 102 in memory 120. The network resource 160 can process the diagnostic report 124, one or more additional criteria (such as thresholds, specifications, or other information associated with the network device 104, or any combination thereof), any other data, or any combination thereof. The diagnostic device 102 can receive at 416 one or more output results from the network resource 160. The one or more output results can indicate how the network device 104 should be directed. For example, the one or more output results can indicate that the network device 104 is not functioning and needs to be sent for repair or scrapped, operational, requires one or more updates to hardware, software, or both, any other indication, or any combination thereof. The diagnostic device 102 can send the one or more output results at 418 to the display device 170, any other computer system, or both. The network resource 160 can store the diagnostic report 124 for later retrieval, such as for generating one or more statistics associated with the diagnostic testing or analysis of one or more network devices 104.

After performing the diagnostic testing or analysis, the diagnostic device 102 can request at 420 an image 122 from the network resource 160. The request can be for an image 122 associated with a disaster recovery image (such as a rescue image 211), a programmable disaster recovery image (such as programmable rescue image 217), a program image 215A (such as a diagnostic image 205, a factory flash image, system software, any other image, or any combination thereof), any other image, or a combination thereof. The diagnostic device 102 can receive at 422 the image and then send at 424 the image to the network device 104 for storing in memory or non-volatile storage 212. In one or more embodiments, the image can clear any previously stored information in memory 206, memory or non-volatile storage 212, or both. For example, the network device 104 can be directed to be scrapped and the image can be downloaded to the network device 104 to clear or wipe (for example, a clean-and-screen process) any personal user information from the network device 104, such as any image or data in a programmable flash memory.

Figure 5:
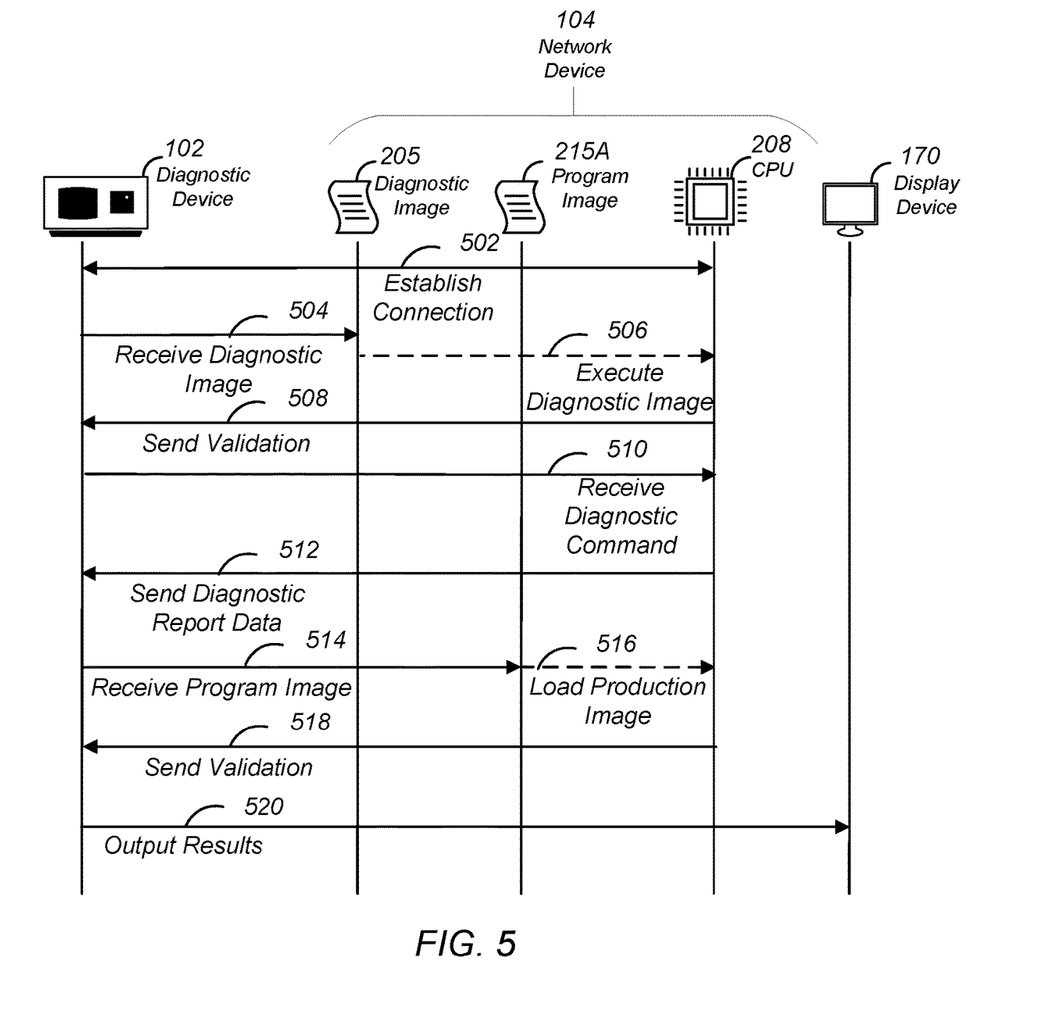
FIG. 5 is a flow diagram for performing diagnostic testing or analysis of a network device, according to one or more aspects of the present disclosure.

FIG. 5 is a flow diagram for performing diagnostic testing or analysis of a network device 104, according to one or more aspects of the present disclosure. As similarly discussed with FIG. 4, a connection is established at 502 between the network device 104. For example, a controller 208 (such as a central processing unit (CPU)) of the network device 104 can authenticate the connection. The network device 104 can receive at 504 diagnostic image (such as an image 122) from the diagnostic device 102 as a diagnostic image 205 and the controller 208 can execute at 506 the diagnostic image 205. In one or more embodiments, after the connection is established, the controller 208 can load into memory 206 a program image 215B as the diagnostic image 205 from a memory or non-volatile storage 212. The program image 215B can be updated by the received diagnostic image 205 at 504 or executed in lieu the diagnostic image 205 at 504. The controller 208 can send at 508 a validation of the diagnostic image 205 to the diagnostic device 102, for example, a checksum or any other indication that the diagnostic image 205 is executable by the network device 104.

To begin the diagnostics analysis or testing of the network device 104, the controller 208 can receive at 510 a diagnostics command from diagnostic device 102. The diagnostic command can initiate one or more specific tests associated with the execution of the diagnostic image 205, initiate the sending at 512 of diagnostic data 207 associated with the execution of the diagnostic image 205, or both. In one or more embodiments, the diagnostic command can be a USB EXEC command. In one or more embodiments, the controller 208 initiates execution of diagnostic image 205 and sending at 512 of diagnostic data 207 without receiving a command from the diagnostic device 102.

After completion of the diagnostic testing or analysis, for example, execution of the diagnostic image 205 has completed, the program image 215A can be received at 514 by the network device 104 and the controller 208 can load at 516 the program image 215A to verify the operability of the program image 215A. The controller 208 can send a validation to the diagnostic device 102, for example, as part of or included with diagnostic data 207. In one or more embodiments similar to FIG. 4, the program image 215A can clear any previously stored information in memory 206, memory or non-volatile storage 212, or both. Similar to FIG. 4, the diagnostic device 102 can send the one or more output results to the display device 170. As discussed with FIG. 4, in one or more embodiments, the diagnostic device 102 can send the diagnostic report data to a network resource 160, the network resource 160 can generate a diagnostic report 124 that is sent to the diagnostic device 102, and the diagnostic device 102 can output the diagnostic report 124 to the display device 170. In one or more embodiments, the display device 170 is coupled to the network resource 160 and the network resource 160 outputs the diagnostic report 124 to the display device 170. For example, the diagnostic report 124 can be output to the display device 170 as a web page in a web browser.

Figure 6:
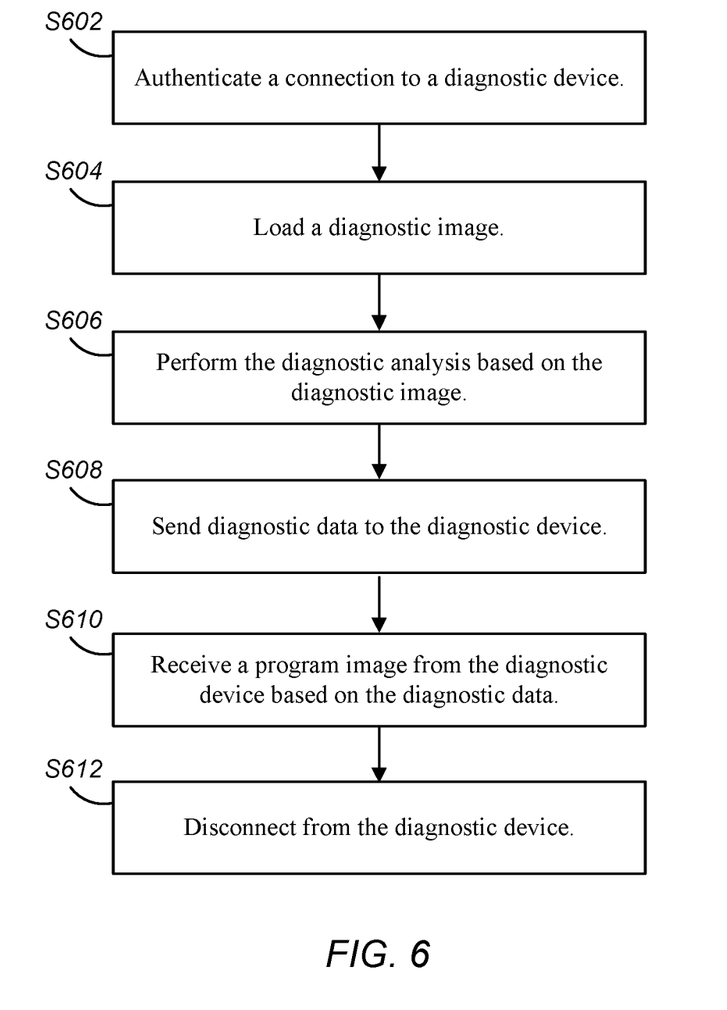
FIG. 6 is a flow diagram for initiating a diagnostic testing or analysis of a network device, according to one or more aspects of the present disclosure.

FIG. 6 is a flow diagram for initiating, for example, automatically, a diagnostic testing or analysis of a network device 104, according to one or more aspects of the present disclosure. A diagnostic device 102, a network device 104, a network resource 160 may be programmed with one or more computer-readable instructions that when executed by a controller or processor cause one or more operations according to FIG. 6. In FIG. 6, it is assumed that any one or more of the devices include their respective controllers and their respective software stored in their respective memories, as discussed above in connection with any of FIGS. 1-5, which when executed by their respective controllers perform the functions and operations in accordance with the example embodiments of the present disclosure (for example, including performing a configuration of one or more network devices). While the steps S602-S612 are presented in a certain order, the present disclosure contemplates that any one or more steps can be performed simultaneously, substantially simultaneously, repeatedly, in any order or not at all (omitted).

A diagnostic analysis of a network device 104 can be initiated at step S602 by authenticating a connection to a diagnostic device 102. For example, a network device 104 can be received at a facility that includes a network, such as a network 100 of FIG. 1. The network device 104 is coupled to or otherwise placed in communication with a diagnostic device 102. The diagnostic device 102 can attempt to establish a connection to the network device 104, for example, via a wired or wireless connection, such as via a Wi-Fi and/or via a connection between a connector 140 and a connector 214 so as to establish a connection 114. In one or more embodiments, the authentication is based on the network device 104 receiving a boot loader key sequence from the diagnostic device 102, for example, to cause a programmable rescue image 217, such as a programmable disaster recovery image (PDRI), a diagnostic firmware image, a production firmware image (including, for example, a firmware image constructed using a reference design kit (RDK), an Android framework, a Windows framework, any other framework, etc.), any other firmware image, or any combination thereof, to be loaded by the boot loader 213 into the memory 206 from a memory or non-volatile storage 212 so as to perform the authentication. For example, the programmable rescue image 217 can be a production firmware image loaded during end-user or customer use of the network device 104. In one or more embodiments, a secure sockets layer (SSL) certificate is received from the diagnostics device 102. The SSL can then be verified by the network device 104 against a root certificate authority (CA) certificate, for example, stored in a memory or non-volatile storage 212 of the network device 104. The network device 104 can send a certification, such as any of a validation, a verification, an authentication, or any combination thereof, to the diagnostic device 102. In one or more embodiments, the diagnostic device 102 receives a certificate, the SSL certificate or any other certificate, from a network resource 160 and the authentication with the network device 104 is based on the received certificate.

Once the authentication has been performed, at step S604 the network device 104 can load a diagnostic image 205, for example, based on receiving a key sequence or a key in addition to any key sequence or initiation started at step S602. For example, the network device 104 can receive a special key sequence from the diagnostic device 102 that causes, for example, the boot loader 213 to load a program image 215B from memory or non-volatile storage 212 as a diagnostic image 205 in memory 206. In one or more embodiments, an image 122 can be received from the diagnostic device 102 and loaded into memory 206 as a diagnostic image 205. In one or more embodiments, the diagnostic device 102 can receive the image 122 from a network resource 160.

At step S606, a diagnostic analysis or testing is performed based on the diagnostic image 205. In one or more embodiments, the diagnostic image 205 is an image 122 downloaded from the diagnostic device 102, a program image 215 loaded from a memory or non-volatile storage 212, or both. The diagnostic analysis or testing can include the testing or analysis of one or more elements 311A associated with a hardware test 310A, one or more elements 311B associated with one or more software tests 310B, or both. In one or more embodiments, the performing the diagnostic analysis or testing is based on a diagnostics initiation command that is received from the diagnostic device 102. For example, the diagnostic initiation command can cause the controller 208 to initiate or execute the one or more computer-readable instructions associated with the diagnostic image 205 such that the diagnostic analysis or testing is initiated or performed. The diagnostic initiation command can be the same as or similar to the diagnostics command at 510 of FIG. 5.

The diagnostics initiation command can comprise a plurality of commands, such as one or more commands generated from a script executed by the diagnostic device 102. In one or more embodiments, the diagnostics analysis or testing comprises a clean-and-screen process or similar process that clears or wipes data, such as user data, customer data, personal data, any other data, or a combination thereof, from the network device 104.

In one or more embodiments, the diagnostic analysis or testing of step S606 can comprise detecting a status 313 of an element 311 associated with a test 310, for example, as discussed with reference to FIG. 3, and generate the diagnostic data 207 based on the status 313. The diagnostic data 207 from the test 310 can be any of generated as a diagnostic report (such as diagnostic report 300), stored in memory 206 as a diagnostic data 207, transmitted to the diagnostic device 102, the network resource 160, or any other storage medium, or any combination thereof.

At step S608, diagnostic data is sent from the network device 104 to the diagnostic device 102. The diagnostic data 207 is based on the diagnostic analysis performed in step S606. The network device 104 can store diagnostic data as diagnostic data 207 in a memory 206 and can send the diagnostic data 207 to the diagnostic device 102 in real-time, periodically, routinely, at the request of the diagnostic device 102, or any combination thereof.

At step S610, a program image 215 is received from the diagnostic device 102 based on the diagnostic data 207 provided in step S608. For example, the diagnostic device 102 can determine that the network device 104 is functional or operational and can download an image 122 as a program image 215 to the network device 104. The program image 215 can comprise a PDRI, a RDK, a FFI, any other image, or a combination thereof.

At step S612, the connection (such as a wired connection, a wireless connection, or both) between the network device 104 and the diagnostic device 102 is disconnected. The network device 104 can then be directed appropriately, for example, based on a diagnostic report 124 generated based on the diagnostic data 207. For example, the network device 104 can be directed to a refurbishment facility for repairs of one or more elements 311 as identified by an associated status 313 in the diagnostic report 124, a shipment facility for redeployment into the field or other site, a recycling or other waste management facility, or any other facility, department, or storage area.

Figure 7:
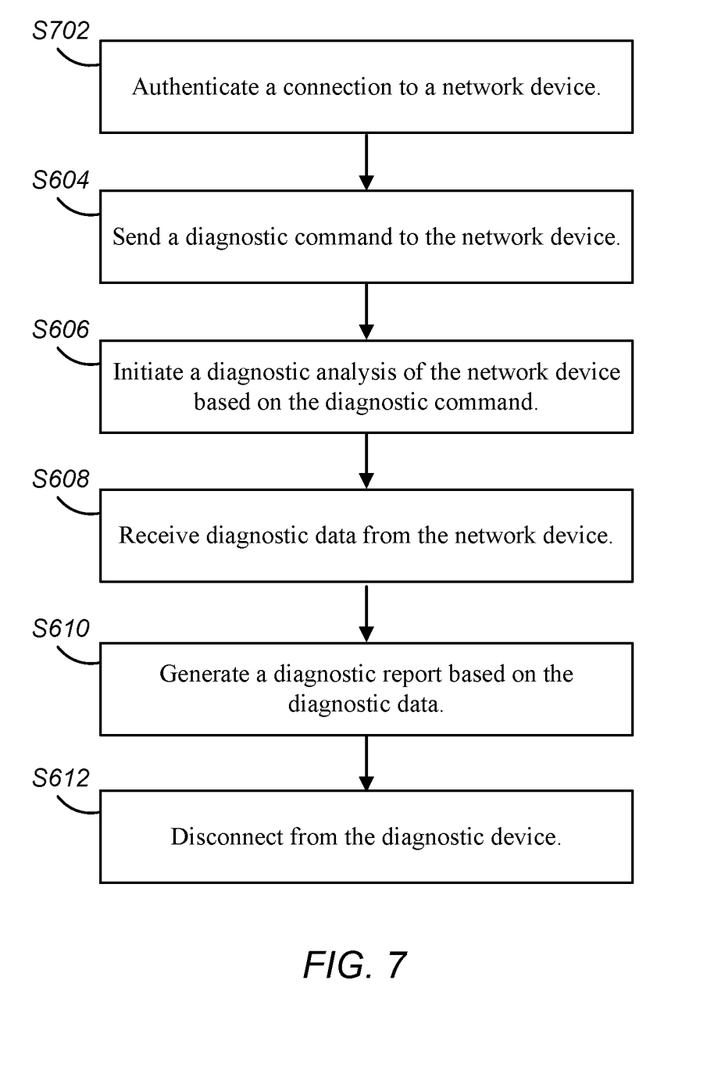
FIG. 7 is a flow diagram for performing diagnostic testing or analysis of a network device, according to one or more aspects of the present disclosure.

FIG. 7 is a flow diagram for a diagnostic device 102 to initiate, for example, automatically, a diagnostic testing or analysis of a network device 104, according to one or more aspects of the present disclosure. A diagnostic device 102, a network device 104, a network resource 160 may be programmed with one or more computer-readable instructions that when executed by a controller or processor cause one or more operations according to FIG. 7. In FIG. 7, it is assumed that any one or more of the devices include their respective controllers and their respective software stored in their respective memories, as discussed above in connection with any of FIGS. 1-5, which when executed by their respective controllers perform the functions and operations in accordance with the example embodiments of the present disclosure (for example, including performing a configuration of one or more network devices). While the steps S702-S712 are presented in a certain order, the present disclosure contemplates that any one or more steps can be performed simultaneously, substantially simultaneously, repeatedly, in any order or not at all (omitted).

A diagnostic analysis of a network device 104 can be initiated at S702 by authenticating a connection to a diagnostic device 102. For example, authentication can occur as discussed with reference to step S602 of FIG. 6. In one or more embodiments, the diagnostic device 102 exchanges a certificate with the network device 104. The diagnostic device 102, can receive an acknowledgement from the diagnostic device 102 that the diagnostic device 102 is recognized or otherwise authorized to place the network device 104 in diagnostic mode or to cause initiation of a diagnostic test or analysis. In one or more embodiments, the diagnostic device 102 connects to the network device 104 via a plurality of connections, for example, a first connection of the plurality of connections is a wired connection and a second connection of the plurality of connections is a wireless connection.

At step S704, the diagnostic device 102 sends a diagnostic command to the network device 104, for example, a diagnostic command as discussed at 510 of FIG. 5. The diagnostic command can comprise an instruction, a key sequence, a script, any other command that causes the network device 104 to initiate a diagnostic testing or analysis. At step S706, the network device 104 initiates a diagnostic test or analysis of the network device 104 based on the diagnostic command. At step S708, the diagnostic device 102 receives diagnostic data 207 from the network device 104. At step S710, the diagnostic data 207 is used to generate a diagnostic report 124. In one or more embodiments, the diagnostic report 124 is generated based on information received from a network resource 160 and the diagnostic data 207. For example, the diagnostic data 207 can be sent to the network resource 160 by the diagnostic device 102 and the network resource 160 can send a diagnostic report 124 to the diagnostic device 102. The diagnostic report 124 can be generated based on identifying a status 313 of one or more elements 311 as indicated by the diagnostic data 207. For example, the diagnostic data 207 can indicate whether an element 311 is functional or non-functional (a status 313) including any additional data or information necessary to adequately indicate the results of the testing. For example, the diagnostic data 207 can indicate a reason for a failure or issue associated with an element 311. The diagnostic report 124 can be used to identify a condition of the network device 104 or how to direct the network device 104. In one or more embodiments, the program image 215 can be requested by the diagnostic device 102 from a network resource 160 based on the diagnostic report 124, information received from the network device 104, or both. For example, the diagnostic report 124 can indicate that the network device 104 is operational, functional, or otherwise usable by a user or customer such that the program image 215 is a production image or FFI and information received from the network device 104, for example, during authentication, can indicate one or more identifiers associated with the network device 104 such that the program image 215 is requested based on the one or more identifiers and any one or more values associated with the diagnostic report.

At step S712, the diagnostic device 102 is disconnected from the network device 104 and the network device 104 is appropriately directed based on the diagnostic report 124. In one or more embodiments, the diagnostic device 102 can output the diagnostic report 124 to a display device before or after disconnecting the network device 104.

In one or more embodiments, a network device 104 is returned to a facility, such as within a network 100 of FIG. 1. The network device 104 can include a bar code or other identifier that can be scanned by any device within the network 100, for example, by a diagnostic device 102 so as to obtain any of a history, a version, a make, a model, any other identifying information, or any combination thereof of the network device 104. The network device 104 is connected to any of the network connection 150, diagnostic device 102, network resource 160, or any combination thereof and is powered-up. The network device 104 is connected to a diagnostic device 102 via a wired connection, a wireless connection, or both before and/or after being powered-up. The network device 104 can be placed in a diagnostic mode based on a special key sequence received from the diagnostic device 102 via the connection. In one or more embodiments, the key sequence requires a plurality of connections between the network device 104 and the diagnostic device 102. If the key sequence is successfully authenticated and the network device 104 is placed in the diagnostic mode, the boot loader 213 can load a program image 215 as a diagnostic image 205 in the memory 206, load an image 122 received from the diagnostic device 102 as the diagnostic image 205 in the memory 206, or receive the diagnostic image 205 from a network resource 160. Execution of the diagnostic image 205 by the controller 208 can cause one or more tests of one or more elements 311 associated with a test 310 to be performed and for diagnostic data 207 to be collected or generated. For example, a status 313 (such as a pass or fail) of an element 311 (such as a hardware element 311A or a software element 3111B) associated with a test (such as hardware test 311A or a software test 3111B) can be collected as diagnostic data 207. The diagnostic data 207 can be sent to a diagnostic device 102 and used to generate a diagnostic report 124. If the diagnostic report 124 indicates a failure or that one or more elements 311 meet, reach and/or exceed a threshold, the network device 104 can be directed to, for example, a refurbishment facility, a repair facility, or any other location, department, or site. The diagnostic report 124 can be stored in a network resource 160 such that the diagnostic report 124 can be accessed from any facility or location. For example, if the network device 104 is sent for repairs, the diagnostic report 124 can be accessed to identify the issue, such as the element 311, that requires repair, the repair needed, any other information, or a combination thereof.

In one or more embodiments, a network device 104 is received at a facility, for example, within a network 100. The network device 104 is loaded with a program image 215, such as a PDRI. The PDRI can be based on any kernel or framework, for example, a minimal Linux kernel built into the build-root environment. The PDRI can have a small flash footprint, boot quickly, and be easily customized. In one or more embodiments, the PDRI can be included as part of the FFI. The FFI can comprise a complete image of flash memory that can include the boot loader, DRI, PDRI, one or more production firmware images, a manufacturing test image, a diagnostic image, or any combination thereof. The FFI can be loaded directly onto a memory during assembly, for example a flash memory. A diagnostic device 102 can be connected to the network device 104 via one or more connections 114. The diagnostic device 102 can send a key sequence to the network device 104. The key sequence can be a boot loader key sequence that cause the boot loader 213 to load the program image 215 (such as a PDRI or DRI) into the memory 206. In one or more embodiments, diagnostic device 102 can send a test sequence key, in addition to or in lieu of the key sequence, to the network device 104 to cause the network device 104 to be placed in a diagnostic mode that allows for the diagnostic testing or analysis of one or more elements 311 of the network device 102. For example, the test sequence key can cause an image to launch in a diagnostic mode, for the program image 215 to cause the boot loader 213 to load a diagnostic image 205 (such as any of a program image 215, an image 122 from the diagnostic device 102, an image from a network resource 160, any other image, or a combination thereof). In one or more embodiments, the diagnostic image 205 is a diagnostic testing or analysis software, a clean-and-screen application, or any other testing software.

In one or more embodiments, execution of the diagnostic image 205 enables Ethernet for commutations with a back-end server, such a network resource 160. One or more dynamic host configuration protocol (DHCP) options, one or more configuration files, or both can be utilized by the diagnostic image 205 to determine one or more modes of operation for execution of the diagnostic image 205. For example, the one or more configuration files, the one or more DHCP options, or both retrieved from a remote resource 160, a diagnostic device 102, or both. The one or more configuration files can be download to the network device 104 via the diagnostics device 102 and/or any other device.

In one or more embodiments, the diagnostic image 205 initiates a hardware test 310A once the Linux kernel boots. The one or more elements 311A associated with the hardware test 310A can test the one or more hardware failures associated with the type of network device 104. For example, the diagnostic device 102 can determine the type of network device 104 based on information received from the network device 104 and initiate one or more tests 310 at the network device 104, such as by causing an image 122 associated with the type of network device 104 to be downloaded to the network device 104 as a diagnostic image 205. The controller 208 can execute the one or more computer-readable instructions associated with the diagnostic image 205 to test one or more hardware elements 311A for a hardware failure, such as any of a HDD failure, a flash failure, a SD card failure, a DOCSIS failure, a Wi-Fi failure, a MoCA failure, an LED failure, a cable modem failure, a video hardware failure, a failure associated with one or more connectors 214, any other hardware failure, or a combination thereof, and/or one or more software elements 311B for a software failure, such as any of a memory read failure, an interface failure, a checksum failure, any other type of software failure, or a combination thereof. Any one or more tests 310 can generate diagnostic data 207 which can be sent to a storage device, such as the diagnostic device 102, the network resource 160, any other storage medium, or a combination thereof and used to generate a diagnostic report 124. The diagnostic device 102, the network resource 160, or both can utilize the diagnostic report 124 to determine whether a network device 104 has passed or failed the diagnostic testing or analysis. If one or more elements 310 of the network device 104 do not pass or meet a threshold, the network device 104 can be directed to be repaired, refurbished, or otherwise processed. If one or more elements of the network device 104 pass or meet a threshold, the network device 104 can be processed for restocking or redistribution. For example, a program image 215, such as a clean-and-screen application, can be initiated by a key sequence from the diagnostic device 102 such that an update process is executed. The update process can include any of removal of one or more objects or data from the network device 104, loading one or more objects are data, down-loading one or more images 122 as a program image 215, such as any of an updated PDRI, an RDKI, any other version of production image, or any combination thereof, any other update process, or any combination thereof. The network device 104 can send an update parameter to the diagnostic device 102 to indicate the success and/or failure of any portion of the update process. The update parameter can be stored as part of the diagnostic report 124. The determination whether to the redeploy the network device 104 can be based on the update parameter, any other part of the diagnostic report 124, or any combination thereof.

Techniques consistent with the present disclosure provide, among other features, systems and methods for a diagnostic testing or analysis of a network device 104 using a diagnostic device 102 so as to improve the diagnostic testing or analysis, for example, to improve the accuracy, reliability, results, or any other factors associated with a network device 104. For example, according to one or more embodiments discussed herein a network device 104 can be directed appropriately, such as for re-use, repair, disposal, any other use, or any combination thereof. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

Each of the elements of the present invention may be configured by implementing dedicated hardware or a software program on a memory controlling a processor to perform the functions of any of the components or combinations thereof. Any of the components may be implemented as a CPU or other processor reading and executing a software program from a recording medium such as a hard disk or a semiconductor memory, for example. The processes disclosed above constitute examples of algorithms that can be affected by software, applications (apps, or mobile apps), or computer programs. The software, applications, computer programs or algorithms can be stored on a non-transitory computer-readable medium for instructing a computer, such as a processor in an electronic apparatus, to execute the methods or algorithms described herein and shown in the drawing figures. The software and computer programs, which can also be referred to as programs, applications, components, or code, include machine instructions for a programmable processor, and can be implemented in a high-level procedural language, an object-oriented programming language, a functional programming language, a logical programming language, or an assembly language or machine language.

The term "non-transitory computer-readable medium" refers to any computer program product, apparatus or device, such as a magnetic disk, optical disk, solid-state storage device (SSD), memory, and programmable logic devices (PLDs), used to provide machine instructions or data to a programmable data processor, including a computer-readable medium that receives machine instructions as a computer-readable signal. By way of example, a computer-readable medium can comprise DRAM, RAM, ROM, EEPROM, CD-ROM or other optical disk storage, magnetic disk storage or other magnetic storage devices, or any other medium that can be used to carry or store desired computer-readable program code in the form of instructions or data structures and that can be accessed by a general-purpose or special-purpose computer, or a general-purpose or special-purpose processor. Disk or disc, as used herein, includes compact disc (CD), laser disc, optical disc, digital versatile disc (DVD), floppy disk and Blu-ray disc. Combinations of the above are also included within the scope of computer-readable media.

The word "comprise" or a derivative thereof, when used in a claim, is used in a nonexclusive sense that is not intended to exclude the presence of other elements or steps in a claimed structure or method. As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise. Use of the phrases "capable of," "configured to," or "operable to" in one or more embodiments refers to some apparatus, logic, hardware, and/or element designed in such a way to enable use thereof in a specified manner.

While the principles of the inventive concepts have been described above in connection with specific devices, apparatuses, systems, algorithms, programs and/or methods, it is to be clearly understood that this description is made only by way of example and not as limitation. The above description illustrates various example embodiments along with examples of how aspects of particular embodiments may be implemented and are presented to illustrate the flexibility and advantages of particular embodiments as defined by the following claims, and should not be deemed to be the only embodiments. One of ordinary skill in the art will appreciate that based on the above disclosure and the following claims, other arrangements, embodiments, implementations and equivalents may be employed without departing from the scope hereof as defined by the claims. It is contemplated that the implementation of the components and functions of the present disclosure can be done with any newly arising technology that may replace any of the above-implemented technologies. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What we claim is:

1. A method of a network device for performing a diagnostic analysis, the method comprising:
   authenticating a connection to a diagnostic device, wherein authenticating the connection comprises:
      switching from a normal mode to a diagnostic mode; and
      indicating to the diagnostic device that the connection is established and the network device is in the diagnostic mode;
   loading a diagnostic image from a memory of the network device based on a key sequence or a key from the diagnostic device, wherein the diagnostic image comprises one or more instructions;
   executing the one or more instructions, wherein executing the one or more instructions comprises:
      performing the diagnostic analysis; and
      sending diagnostic data to the diagnostic device, wherein the diagnostic data is based on the diagnostic analysis; and
   disconnecting from the diagnostic device.

2. The method of claim 1, further comprising:
   receiving a diagnostics initiation command from the diagnostic device; and
   wherein the performing the diagnostic analysis is based on the diagnostics initiation command.

3. The method of claim 1, wherein the authenticating the connection to the diagnostic device comprises:
   receiving secure sockets layer (SSL) certificate from the diagnostic device; and
   verifying the SSL certificate against a root certificate authority (CA) certificate.

4. The method of claim 1, wherein the diagnostic image is downloaded from the diagnostic device.

5. The method of claim 1, wherein the diagnostic image is loaded from a programmable memory of the network device.

6. The method of claim 1, wherein the performing the diagnostics analysis comprises:
   detecting a status of one or more elements of the network device; and
   generating the diagnostic data based on the status of the one or more elements.

7. The method of claim 1, further comprising:
   receiving a program image from the diagnostic device based on the diagnostic data.

8. A network device for performing a diagnostic analysis, comprising:
   a memory storing one or more computer-readable instructions;
   a processor configured to execute the one or more computer-readable instructions to:
      authenticate a connection to a diagnostic device, wherein authenticating the connection comprises:
         switching from a normal mode to a diagnostic mode; and
         indicating to the diagnostic device that the connection is established and the network device is in the diagnostic mode;
      load a diagnostic image from a memory of the network device based on a key sequence or a key from the diagnostic device, wherein the diagnostic image comprises one or more instructions;
      execute the one or more instructions, wherein executing the one or more instructions comprises:
         performing the diagnostic analysis; and
         sending diagnostic data to the diagnostic device, wherein the diagnostic data is based on the diagnostic analysis; and
      disconnect from the diagnostic device.

9. The network device of claim 8, wherein the processor is further configured to execute the one or more computer-readable instructions to:
   receive a diagnostics initiation command from the diagnostic device; and
   wherein the performing the diagnostic analysis is based on the diagnostics initiation command.

10. The network device of claim 8, wherein the authenticating the connection to the diagnostic device comprises:
    receiving secure sockets layer (SSL) certificate from the diagnostic device; and
    verifying the SSL certificate against a root certificate authority (CA) certificate.

11. The network device of claim 8, wherein the diagnostic image is downloaded from the diagnostic device.

12. The network device of claim 8, wherein the diagnostic image is loaded from a programmable memory of the network device.

13. The network device of claim 8, wherein the performing the diagnostics analysis comprises:
  detecting a status of one or more elements of the network device; and
  generating the diagnostic data based on the status of the one or more elements.

14. The network device of claim 8, wherein the processor is further configured to execute the one or more computer-readable instructions to:
  receive a production image from the diagnostic device based on the diagnostic data.

15. A non-transitory computer-readable medium of a network device storing one or more instructions for performing a diagnostic analysis, which when executed by a processor of the network device, cause the network device to perform one or more operations to:
  authenticate a connection to a diagnostic device, wherein authenticating the connection comprises:
    switching from a normal mode to a diagnostic mode; and
    indicating to the diagnostic device that the connection is established and the network device is in the diagnostic mode;
  load a diagnostic image from a memory of the network device based on a key sequence or a key from the diagnostic device, wherein the diagnostic image comprises one or more instructions;
  executing the one or more instructions, wherein executing the one or more instructions comprises:
    performing the diagnostic analysis; and
    sending diagnostic data to the diagnostic device, wherein the diagnostic data is based on the diagnostic analysis; and
  disconnect from the diagnostic device.

16. The non-transitory computer-readable medium of claim 15, wherein the one or more instructions when further executed by the processor cause the network device to further perform the one or more operations to:
  receive a diagnostics initiation command from the diagnostic device; and
  wherein the performing the diagnostic analysis is based on the diagnostics initiation command.

17. The non-transitory computer-readable medium of claim 15, wherein the authenticating the connection to the diagnostic device comprises:
  receiving secure sockets layer (SSL) certificate from the diagnostic device; and
  verifying the SSL certificate against a root certificate authority (CA) certificate.

18. The non-transitory computer-readable medium of claim 15, wherein the diagnostic image is one of downloaded from the diagnostic device or loaded from a programmable memory of the network device.

19. The non-transitory computer-readable medium of claim 15, wherein the performing the diagnostics analysis comprises:
  detecting a status of one or more elements of the network device; and
  generating the diagnostic data based on the status of the one or more elements.

20. The non-transitory computer-readable medium of claim 15, wherein the processor is further configured to execute the one or more computer-readable instructions to:
  receive a production image from the diagnostic device based on the diagnostic data.

* * * * *